(12) United States Patent
Oelke

(10) Patent No.: US 12,481,277 B2
(45) Date of Patent: Nov. 25, 2025

(54) MONITORING DEVICE AND METHOD FOR DETECTING ANOMALIES

(71) Applicant: Siemens Aktiengesellschaft, Munich (DE)

(72) Inventor: Daniela Oelke, Offenburg (DE)

(73) Assignee: Siemens Aktiengesellschaft, Munich (DE)

( * ) Notice: Subject to any disclaimer, the term of this patent is extended or adjusted under 35 U.S.C. 154(b) by 473 days.

(21) Appl. No.: 18/018,623

(22) PCT Filed: Aug. 3, 2021

(86) PCT No.: PCT/EP2021/071693
§ 371 (c)(1),
(2) Date: Jan. 30, 2023

(87) PCT Pub. No.: WO2022/029137
PCT Pub. Date: Feb. 10, 2022

(65) Prior Publication Data
US 2023/0297095 A1    Sep. 21, 2023

(30) Foreign Application Priority Data

Aug. 4, 2020 (EP) ..................... 20189396
Aug. 18, 2020 (EP) ..................... 20191509

(51) Int. Cl.
*G05B 23/02* (2006.01)
*G06F 16/906* (2019.01)

(52) U.S. Cl.
CPC ......... *G05B 23/024* (2013.01); *G06F 16/906* (2019.01)

(58) Field of Classification Search
CPC ...... G05B 23/024; G06F 16/906; G06F 16/35
See application file for complete search history.

(56) References Cited

U.S. PATENT DOCUMENTS

2005/0201452 A1    9/2005   Chang
2016/0342903 A1    11/2016  Shumpert
(Continued)

FOREIGN PATENT DOCUMENTS

CN    102253426 A    11/2011
CN    106714220 A    5/2017
(Continued)

OTHER PUBLICATIONS

Wang et al., "Progress in Outlier Detection Techniques: A Survey", Aug. 19, 2019, IEEEAccess, vol. 7, pp. 107964-10800, Digital Object Identifier 10.1109/ACCESS.2019.2932769 (Year: 2019).*
(Continued)

*Primary Examiner* — Mi'schita' Henson
(74) *Attorney, Agent, or Firm* — Schmeiser, Olsen & Watts, LLP

(57) ABSTRACT

A monitoring device for detecting anomalies on the basis of sensor data determined over time is provided, including an input interface to receive a new sensor data point, an analysis unit to determine a minimum reachability distance for the new sensor data point with respect to a selection of adjacent training data points and to determine a minimum position for the new sensor data point in a reachability diagram, to insert the new sensor data point in the reachability diagram after the minimum position and before the training data point having a greater reachability distance than the determined minimum reachability distance, to assign the new sensor data point to a particular cluster and to assign a status as normal or abnormal, and an output interface to output the assignment determined for the new sensor data point as the result of the anomaly detection.

15 Claims, 4 Drawing Sheets

(56) References Cited

U.S. PATENT DOCUMENTS

| | | | |
|---|---|---|---|
| 2017/0193078 A1 | 7/2017 | Limonad et al. | |
| 2018/0165894 A1 | 6/2018 | Martin et al. | |
| 2019/0154474 A1 | 5/2019 | Kausler et al. | |
| 2020/0012270 A1 | 1/2020 | Hollender et al. | |
| 2020/0112577 A1 | 4/2020 | Han et al. | |
| 2020/0209842 A1 | 7/2020 | Koizumi et al. | |
| 2023/0106311 A1* | 4/2023 | Sepe | G05B 23/0275 702/184 |
| 2024/0046184 A1* | 2/2024 | Dividino | G06Q 10/083 |
| 2025/0231558 A1* | 7/2025 | Kanchi | G05B 23/024 |

FOREIGN PATENT DOCUMENTS

| | | |
|---|---|---|
| CN | 107358347 A | 11/2017 |
| CN | 108647737 A | 10/2018 |
| CN | 109067725 A | 12/2018 |
| CN | 109829470 A | 5/2019 |
| CN | 111108362 A | 5/2020 |
| CN | 111143838 A | 5/2020 |
| EP | 3364157 A1 | 8/2018 |
| JP | 5530019 B1 | 6/2014 |

OTHER PUBLICATIONS

Hotait, H. et al:; "Monitoring of Ball Bearing Based on Improved Real-Time OPTICS Clustering"; Journal of Signal Processing Systems; XP055770215; ISSN: 1939-8018; DOI: 10.1007/s11265-020-01571-w; 2020.

Benmahdi, D. et al:; "RT-OPTICS: real-time classification based on OPTICS method to monitor bearings faults"; Journal of Intelligent Manufacturing; Chapman and Hall, London; vol. 30; No. 5; pp. 2157-2170; XP036785555; ISSN: 0956-5515; DOI: 10.1007/S10845-017-1375-6; 2017.

Di Francescomarino, Chiara et al:; "Clustering-Based Predictive Process Monitoring"; IEEE Transactions on Services Computing; IEEE; vol. 12; No. 6; pp. 896-909; XP011760463; DOI: 10.1109/TSC.2016.2645153; 2019.

Zhang, Qiang et al:; "An OPTICS Clustering-Based Anomalous Data Filtering Algorithm for Condition Monitoring of Power Equipment"; Big Data Analytics in the Social and Ubiquitous Context: 5th International Workshop on Modeling Social Media, MSM 2014; 5th International Workshop on Mining Ubiquitous and Social Environments, Muse 2014 and First International Workshop on Machine LE; XP047343262, ISBN: 978-3-642-17318-9; 2015.

PCT International Search Report mailed Nov. 15, 2021 corresponding to PCT International Application No. PCT/EP2021/071693 filed Aug. 3, 2021.

\* cited by examiner

MONITORING DEVICE AND METHOD FOR DETECTING ANOMALIES

CROSS-REFERENCE TO RELATED APPLICATIONS

This application claims priority to PCT Application No. PCT/EP2021/071693, having a filing date of Aug. 3, 2021, which claims priority to EP Application No. 20191509.7, having a filing date of Aug. 18, 2020, and EP Application No. 20189396.3, having a filing date of Aug. 4, 2020, the entire contents all of which are hereby incorporated by reference.

FIELD OF TECHNOLOGY

The following relates to a monitoring apparatus and a method for anomaly detection on the basis of sensor data relating to a technical system that are ascertained continuously over time, by using a density-based clustering function.

BACKGROUND

Monitoring a technical system normally involves parameters relevant to the state of the system being measured by sensors continuously over time. By way of example, measurements of motor current, motor temperature, ground pressure and head pressure are performed for pumps. Other technical systems may be machines, such as for example turbines, motors of any kind, but also devices in industrial plants such as field devices and the like. On the basis of such sensor data, it is possible to identify anomalies in the technical system early on and thereby to achieve great cost savings. Continuous anomaly detection allows a malfunction in the system to be identified early on and repaired in good time, with the result that a complete failure can be avoided.

A characteristic of such monitoring scenarios is that the recorded data are time-dependent and are measured and analyzed dynamically, that is to say at regular or irregular intervals of time. A classification for such a data point as normal or abnormal, that is to say if the data point is consistent with a system in the normal state or if the value of the data point indicates that the system is in an abnormal state, in particular an error state of the system, is intended to be ascertained in a monitoring system promptly, where possible even in real time.

Often, more than one parameter is monitored simultaneously, with the result that a sensor data point comprises a plurality of individual values for different measured parameters of the system. Methods based on artificial intelligence methods (AI) can analyze such time series of sensor data as for example are also measured on different components of the system at the predefined time, and can initiate measures to find the reason for the abnormal behavior.

It is known practice to use methods of artificial intelligence such as for example classification or clustering methods for anomaly detection.

Various methods for AI-based anomaly detection are known. A distinction is drawn in this case between, inter alia, methods that take account of a time dependency in the data and those for which this is not the case. Examples of methods that take account of a time dependency in the data are prediction models that are trained using data from the past and, on that basis, predict a value that is next. If this prediction differs greatly from the observed value, then it can be assumed that there is an anomaly.

The documents by H. HOTAIT ET AL: "Monitoring of Ball Bearing Based on Improved Real-Time OPTICS Clustering", JOURNAL OF SIGNAL PROCESSING SYSTEMS, Jul. 30, 2020, by BENMAHDI D ET AL: "RT-OPTICS: real-time classification based on OPTICS method to monitor bearings faults", JOURNAL OF INTELLIGENT MANUFACTURING, vol. 30, No 5, Nov. 27, 2017, by ZHANG QIANG ET AL: "An OPTICS Clustering-Based Anomalous Data Filtering Algorithm for Condition Monitoring of Power Equipment", Dec. 15, 2015, and by FRANCESCOMARINO CHIARA 01 ET AL: "Clustering-Based Predictive Process Monitoring", IEEE TRANSACTIONS ON SERVICES COMPUTING, vol. 12, No 6, Nov. 1, 2019, describe the clustering method OPTICS, or the ordering-points-to-identify-the-clustering-structure method, for identifying damage in roller bearings and in energy plants in real time or also for predictive process monitoring.

Methods that do not take account of a time reference include for example clustering methods that are capable of identifying outliers as such and of labeling them as such. An advantage of these clustering methods is that different types of normal states can be modeled in the data. These are then represented as different clusters. A prediction model would be able to model different types of normal states only if it is known beforehand which types of normal states there are. A separate model would then need to be trained for each normal state, for example.

As such, it is convenient to use a clustering method for monitoring technical systems in which there may be multiple normal states. However, this has the disadvantage that these do not take account of any time dependency. For each newly added data point, the entire model needs to be calculated with all the data points, including the new data point, and it is necessary to check whether or not the new data point is identified as an outlier. A classification of one or more data points as normal or abnormal is referred to as anomaly detection in the text below.

SUMMARY

An aspect relates to an AI-based anomaly detection method that is able to model multiple normal states and is able to quickly classify sensor data points newly added at intervals of time as being associated with a normal state or just suggesting an abnormal state.

A first aspect of embodiments of the invention relate to a monitoring apparatus for anomaly detection in a technical system (100), in which parameters which are relevant to the state of the system are measured by sensors continuously over time, comprising:
an input interface, designed in such a way as to receive a new sensor data point relating to the technical system,
an analysis unit, designed in such a way as
to ascertain for the new sensor data point a minimum reachability distance with respect to a selection of neighboring training data points, and
to ascertain for the new sensor data point a minimum position in the sequence of the training data points in a reachability graph, which was created by a density-based clustering function using predetermined training data points as input values and in which the sequence of the training data points is in ascending order based on an order of processing of the training data points and in which the reachability distance is indicated for each training data point, to insert the new sensor data point in the reachability graph after the training data point having the minimum position and before the training data point that has a greater reachability distance than the ascertained minimum reachability distance, to assign the new sensor data point to a specific cluster according to the position of the data point in the enhanced reachability graph and to assign a status as normal or abnormal according to the minimum reachability distance, each cluster being assigned to a different operating state of the technical system 100, and an output interface, designed in such a way as to output the assigned status and/or the assigned cluster for an operating mode, and the indication of a status as normal or abnormal, as the result of the anomaly detection, and to trigger an alarm function on the basis of the result of the anomaly detection.

The density-based clustering function of the analysis unit has the advantage of functioning with dynamic sensor data points which are not available for evaluation by the density-based clustering function from the outset, but rather others are added gradually. An analysis of whether the new sensor data point is an outlier and hence suggests that the monitored technical system is in an abnormal state can therefore be ascertained with less computation complexity and hence also more quickly. In particular the assignment of the cluster and the status of the new sensor data point according to the position of the new sensor data point in the enhanced reachability graph permits a very fast first assessment and anomaly detection. Training data points are sensor data points that characterize a normal state of the technical system. Training data may have been measured on the technical system to be monitored or on a technical system that is similar thereto. Training data may also have been generated artificially, however.

In an embodiment, the density-based clustering function is an "ordering-points-to-identify-the-clustering-structure" method, OPTICS method for short. It is thus possible for an already known clustering method to be used as a basis, and adjustments to this OPTICS method are merely required.

In an embodiment, the monitoring apparatus is designed in such a way as to apply the density-based clustering function to the reachability graph enhanced with the new sensor data point and to assign to the new sensor data point the cluster ascertained for it therefrom.

The enhanced reachability graph means that the density-based clustering function already has a predefined starting order for the processing of the training data points and of the new sensor data point. As a result, the number of processing steps to be performed and hence also the length of processing by the density-based clustering function are reduced. The application of the density-based clustering function makes the probability of a correct assignment to a cluster higher and thus more reliable.

In an embodiment, the selection of the neighboring training data points contains all training data points that are at a predefined interval, for example the value ε_max, from the new sensor data point. The predefined interval ε_max determines the number of neighboring training data points to be considered and means that it can therefore be restricted to a few training data points for a small ε_max value, or can be set to a greater number of neighboring training data points for a large predefined interval max. The analysis can therefore be adjusted flexibly according to the density of the data points. This in turn determines the processing time, or the length, of the analysis and means that it is therefore flexibly adjustable.

In an embodiment, the monitoring apparatus is designed in such a way as to use the new sensor data point to assign the core distance to the value infinity if the number of neighboring training data points is less than a predefined number.

As a result, it is possible to ensure that a new sensor data point, which is far away from the other training data points, is likewise taken into account. A core distance is then assumed for this point, as for a first data point during an actual pass of the density-based clustering method. A reachability distance can in turn be ascertained therefrom.

In an embodiment, the monitoring apparatus is designed in such a way as to ascertain for each training data point in the selection of the training data points a reachability distance from the new sensor data point and to assign the shortest of the ascertained reachability distances to the new sensor data point as the minimum reachability distance. It is therefore possible, with little computation complexity, to estimate for the new sensor data point an assignment of the status as an outlier and therefore abnormal, or as normal.

In an embodiment, the monitoring apparatus is designed in such a way as to ascertain in the reachability graph the position of that training data point from the selection of the training data points that has the shortest ascertained reachability distance as the predecessor position and to ascertain the next position as the minimum position for the new sensor data point. It is therefore possible to ascertain the position of the new sensor data point in the reachability graph and to assign the new sensor data point to a cluster.

In an embodiment, the monitoring apparatus is designed in such a way as to insert the new sensor data point at the end of the reachability graph if the reachability distance of each training data point arranged after the predecessor position in the sequence is less than the minimum reachability distance of the new sensor data point.

In an embodiment, the monitoring apparatus is designed in such a way as to perform the steps performed in the analysis unit for all new sensor data points received in a time window of predefined length or for a predefined minimum number of temporally successive new sensor data points, and to output these sensor data points as abnormal only if the ascertained assignments are consistent with a predefined rule.

This allows a time characteristic to be included when rating an anomaly and thus an individual outlier to be identified when there are otherwise other sensor data points classified as normal.

In an embodiment, the rule is a minimum number of new sensor data points detected as normal.

In an embodiment, one rule is a rising number of new sensor data points detected as abnormal in successive time windows.

In an embodiment, the monitoring apparatus has a user interface that is designed in such a way as to receive the length of the time window, the minimum number of new sensor data points or the type of rule. This allows flexible adaptation of the analysis unit for the evaluation and anomaly detection of the new sensor data points. Further parameters of the clustering function may also be input by an expert via the user interface.

In an embodiment, a technical system is one or more machines of a power distribution plant, a power generation or energy extraction plant or one or more devices of an automation plant.

A second aspect of embodiments of the invention relate to a method for anomaly detection relating to a technical system (100), in which parameters which are relevant to the state of the system are measured by sensors continuously over time, by a monitoring apparatus, comprising the steps of
- receiving a new sensor data point relating to the technical system,
- ascertaining for the new sensor data point a minimum reachability distance with respect to a selection of neighboring training data points, and
- ascertaining for the new sensor data point a minimum position in the sequence of the training data points in a reachability graph, which was created by a density-based clustering function using predetermined training data points as input values and in which the sequence of the training data points is in ascending order based on an order of processing of the training data points and in which the reachability distance is indicated for each training data point,
- inserting the new sensor data point in the reachability graph after the training data point having the minimum position and before the training data point that has a greater reachability distance than the ascertained minimum reachability distance,
- assigning a specific cluster to the new sensor data point according to the position of the data point as a graph and assigning a status as normal or abnormal according to the minimum reachability distance, each cluster being assigned to a different operating state of the technical system (100), and
- outputting the assigned status and/or the assigned cluster as the result of the anomaly detection, and
- triggering an alarm function on the basis of the result of the anomaly detection.

New sensor data points that have been measured in a time sequence on the technical system to be monitored can be rated very quickly using the method. It is possible not only to rate whether the new sensor data point suggests that the technical system is in a normal or abnormal state but also to assign the cluster that is consistent for example with a working mode of the technical system. The properties of a density-based clustering function, namely assigning a specific cluster to a point or identifying the point as an outlier, can therefore be extended to new sensor data points added in a time sequence. Each data point is initially considered separately and without time dependencies. The decision as to whether an anomaly or a random variance is involved is taken in a subsequent step in light of a minimum number of new sensor data points, which is predefined, for example.

A third aspect of embodiments of the invention relate to a computer program product (non-transitory computer readable storage medium having instructions, which when executed by a processor, perform actions) comprising a nonvolatile computer-readable medium that can be loaded directly into a memory of a digital computer, comprising program code parts suitable for performing the steps of the method.

Unless indicated otherwise in the description below, the terms "ascertain", "insert", "output" and the like desirably refer to actions and/or processes and/or processing steps which alter and/or generate data and convert data into other data, wherein the data can be represented or be present as physical variables, in particular, for example as electrical pulses. In connection with embodiments of the invention, a monitoring apparatus can be understood to mean for example one or more processors and/or a storage unit for storing program commands. The apparatus can be understood as a standalone apparatus or part of an apparatus.

The respective "unit", e.g. the analysis unit, can be implemented in hardware and/or else in software. In the case of a hardware implementation, the respective unit can be embodied as an apparatus or as part of an apparatus, e.g. as a computer or as a microprocessor or as a control computer. In the case of a software implementation, the respective unit can be embodied as a computer program product, as a function, as a routine, as part of a program code or as an executable object. The embodiments and features described for the proposed monitoring apparatus apply to the proposed method mutatis mutandis.

BRIEF DESCRIPTION

Some of the embodiments will be described in detail, with reference to the following figures, wherein like designations denote like members, wherein.

DETAILED DESCRIPTION

Figure 1:
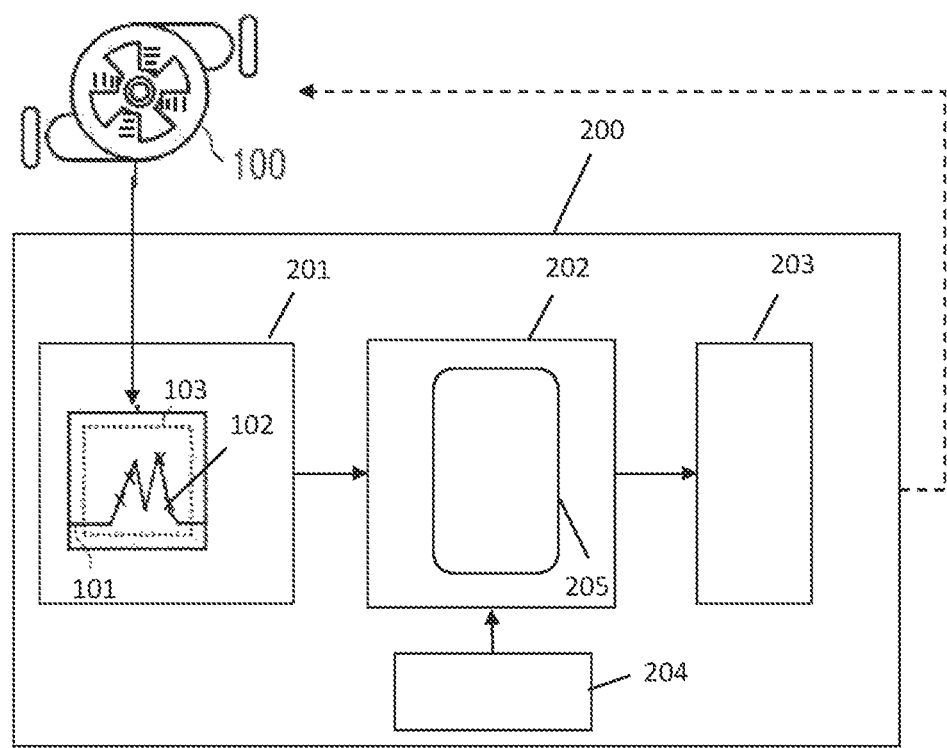
FIG. 1 shows a block diagram of an embodiment of the monitoring apparatus.

FIG. 1 shows a technical system 100 and a monitoring apparatus 200. The technical system 100 can be for example one or more machines in a power distribution, power generation or energy extraction plant or devices of an automation plant. Sensors are used to continuously measure parameters relating to the technical system 100 and to provide one or more of these parameter values to a monitoring apparatus 200 as a sensor data point 102.

The monitoring apparatus 200 comprises an input interface 201, which receives one or more sensor data points 102 from the technical system 100. Sensor data points can be received continuously at short intervals of time, see for example a continuous sensor data point sequence 101, or individual data points, see sensor data point 102, can be received at longer intervals of time.

The monitoring apparatus 200 furthermore comprises an analysis unit 202, which performs a density-based clustering function 205 using the sensor data point as input value. The new sensor data point 102 is assigned to a status as normal or abnormal on the basis of a clustering model, the status of the sensor data point 102 representing the state of the technical system 100 at the time at which the sensor data point 102 was recorded. The density-based clustering function 205 can furthermore assign the sensor data point 102 to different clusters, each cluster having a different assigned, or corresponding, operating state of the technical system 100. The assignment of a cluster to an operating mode, and the indication of a status as normal or abnormal for the sensor data point under consideration is output to an output interface 203 by the analysis unit 202 as the result of the anomaly detection. Based on the result of the anomaly detection, an alarm function can be triggered, for example.

Since individual sensor data points can be ascertained as outliers, which denote an abnormal behavior of the technical system, without there actually being an anomaly, further new sensor data points are additionally analyzed and the sensor data point is output as abnormal only if the results of the anomaly detection are consistent with a predefined rule within a considered time window, see the data in the time window 103 of the input interface 201. Alternatively, instead of a time window of predefined length, a predefined minimum number of temporally successive new sensor data can be analyzed and an anomaly detection performed. Only if the results of this anomaly detection are consistent with a predefined rule is the sensor data point 102 output as abnormal.

One rule is for example that a minimum number of new sensor data points 102 under consideration have been detected as abnormal. One rule is for example that the number of new sensor points 102 detected as abnormal rises in successive time windows 103. Both the temporal length of the time window and a minimum number of data points assigned as abnormal, which are required in order to output an anomaly, and also the type of rule to be applied, can be input by the user interface 204. One specific rule may be for example that the number of new sensor data points labeled as outliers in successive time windows, each time window containing a minimum number of ten new sensor data points, rises over the course of time. The rules can be adapted to suit the behavior of the new sensor data points and thus the state of the technical system 100. These inputs are defined by a domain expert.

Density-based clustering methods, in particular, are suitable for identifying multiple types of normal states and for assigning sensor data points to different clusters as appropriate. Using the example of an ordering-points-to-identify-the-clustering-structure method, referred to as an OPTICS method for short, the text below describes how this method is used and modified in order to be able to perform anomaly detection promptly for new sensor data points 102.

Figure 3:
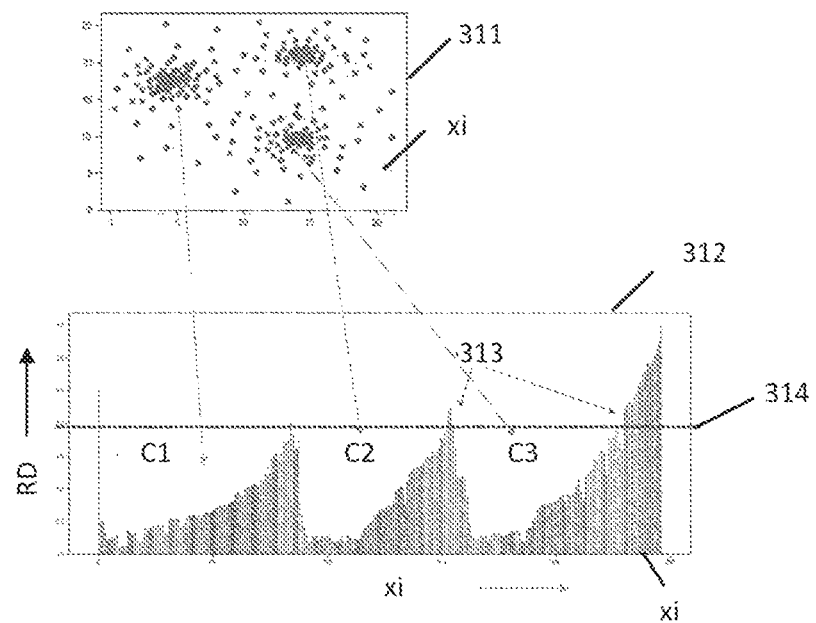
FIG. 3 shows a schematic representation of training data points and a reachability graph ascertained therefrom.

The result of the OPTICS method is visualized as a reachability graph 312, see FIG. 3. The reachability distance RD is plotted on the y axis in this case. The data points xi are plotted along the x axis in a manner sorted according to the order calculated by OPTICS. "Valleys" in the reachability graph 312 correspond to identified clusters C1, C2, C3 in the dataset 311; the depth of the valley indicates the density of the cluster, see FIG. 3.

Figure 2:
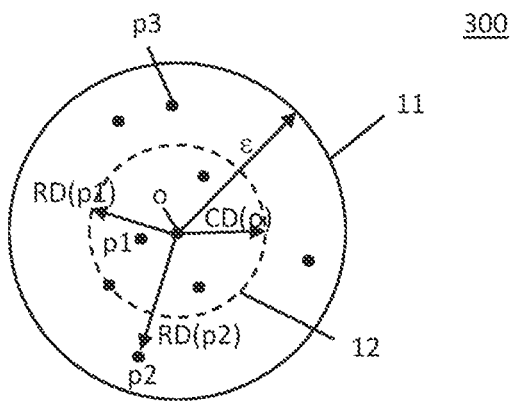
FIG. 2 shows a schematic representation of the conventional ascertainment of a core and reachability distance in accordance with the density-based clustering function.
Figure 4:
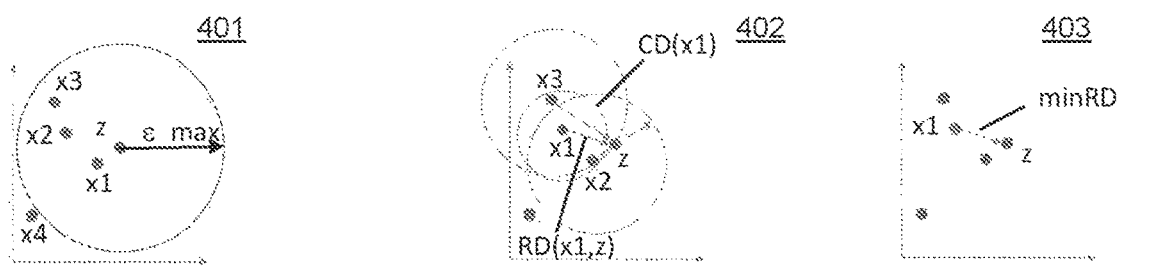
FIG. 4 shows a schematic representation of individual method steps of the method according to embodiments of the invention.
Figure 5:
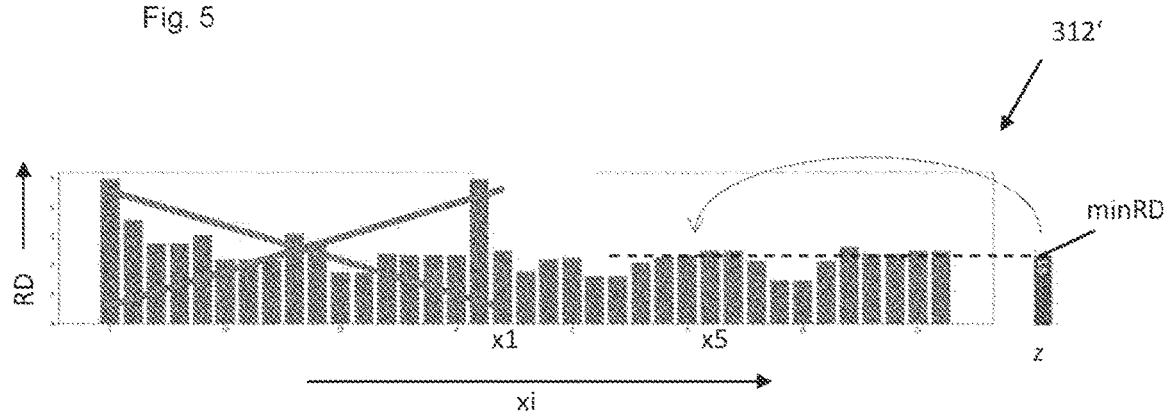
FIG. 5 shows a schematic representation of the method according to embodiments of the invention for ascertaining the minimum position for a new sensor data point in a reachability graph.

FIGS. 2 and 3 are now used to describe the ascertainment of such a reachability graph in an actual pass of the OPTICS method. On the basis of this, FIGS. 4 and 5 are used to describe the inventive extension of the method.

Two dimensions, a core distance CD and a reachability distance RD, are calculated for each data point, the dimensions playing a crucial part for the clustering method. FIG. 2 shows this for a data point o. The OPTICS clustering method has three parameters. Firstly, a maximum E distance ε_max. This defines the radius around the point o considered for the processing. The second parameter is a minimum number MinPts of points. This defines how many points $N_\varepsilon(o)$ there need to be at least within the ε_max radius in order for the point o to be deemed a core point. Additionally, the parameter ε_max is crucial for determining the core distance of the point o. A third parameter is the E value, for which the clustering is created. This value can still be varied after calculation of the cluster structure, and clusterings of different density can therefore be extracted without great computation complexity.

The core distance is generally defined by $$CD_{\varepsilon, MinPts}(o) = \begin{cases} \text{UNDEFINED, if } |N_\varepsilon(o)| < \text{Min}Pts \\ \text{Min}PtsDistance(o), \text{else} \end{cases} \quad (1)$$

The reachability distance is generally defined by $$RD(p, o) = \begin{cases} \text{Undefined, if } |N_{\varepsilon\_max}(o)| < \text{Min}Pts \\ \max\{core - dist(o), dist(o, p)\}, \text{else} \end{cases} \quad (2)$$

The actual progression of the OPTICS clustering method proceeds as follows:

First, a random data point, for example the point xi in FIG. 3, is selected. By definition, this point has the reachability distance "infinity", since the reachability distance RD always needs to be defined via a previously processed point and there are no predecessors in this case. The core distance CD(o) of the point o can be determined, however.

All data points that are at the ε_max radius around the point o are also inserted into a list. They are initially provided with a reachability distance RD, as may be defined using the point o currently under consideration, temporarily. The list is then sorted according to the reachability distance RD of the points. The point that has the shortest reachability distance is then taken from the list and processed next as well. Its points that are at the max radius are also added to the list with a reachability distance from the current point. Should there already be a point in the list, the reachability distance RD of the point is optionally updated, provided that it would become shorter as a result. This scheme is used to continue until the list is empty. If all points have then not yet been processed, an arbitrary, as yet unprocessed point is selected at random. The reachability distances RD can then be entered in a reachability graph 312 in FIG. 3. The points are arranged in the x direction in the order of their processing. In the y direction, the reachability distance RD of the point is entered in each case. By way of illustration, the point xi from the set of data points 311 is entered in the reachability graph 312 with the label xi.

The reachability graph 312 is a visualization of the ascertained cluster hierarchy. The reachability graph also simplifies the adjustment of the E parameter required for extracting the clusters and the definition of outliers, which are labelled using the reference sign 313 in FIG. 3. It should be noted in this case that the core distance of the points is additionally also taken into account when extracting the clusters C1, C2, C3. The red line in the reachability graph 312 can therefore give an intuitive impression of which clusters C1, C2, C3 arise. However, it must be assumed that individual points having a reachability distance RD greater than the E value are nevertheless assigned to a cluster C1, C2, C3 on the basis of their short core distance.

The density-based clustering method, as just described for the OPTICS method, has been used to train the reachability graph 312 for the technical system 100 based on a multiplicity of training data, for example the data points 311 in FIG. 3. The E value 314 shown indicates a maximum reachability distance. If the reachability distance RD ascertained for a data point is greater than this maximum value 314, the data point is labelled as an outlier 313 and assigned to the state abnormal. Each new sensor data point z received by the input interface 201 of the monitoring apparatus 200 is now intended to be either assigned by the analysis unit 202, or density-based clustering function 205, to one of the existing clusters C1, C2, C3 that have been ascertained by way of the training data points xi, or labelled as an outlier.

This requires this new sensor data point z to be inserted at the correct position in the reachability graph 312. To this end, the density-based clustering method, in particular the OPTICS method, could be applied to all points already used previously, that is to say to the training data points, and additionally to the added new sensor data point z. However, such an approach has the disadvantage that it scales poorly, since each new sensor data point z requires the entire density-based clustering method to be performed afresh. Furthermore, unnaturally long reachability distances RD can arise if the new sensor data point z is chosen at random in the course of the method in order to initiate a new cluster. Furthermore, density-based clustering methods such as in particular OPTICS are dependent on order and therefore do not guarantee that the reachability distance RD is optimum for a point.

For this reason, a new sensor data point z is now added as described below with reference to FIG. 4. FIG. 4 shows a new sensor data point z in graph 401. First, all the points x1, x2, x3 that are at an $\varepsilon\_max$ radius around the new sensor data point z are determined. The number of points involved is determined. In the case shown in graph 401, these are the points x1, x2, x3. If there are more than a predefined number MinPts of points, the new sensor data point z is a core point and its core distance CD(z) is determined in accordance with the method described above. If this is not the case, its core distance CD(z) is set to infinity.

The respective reachability distance RD(x1,z), RD(x2,z), RD(x3,z) to the new sensor data point z is then ascertained for each point at the max radius, that is to say starting out from each of the points x1, x2, x3. This is shown in graph 402. To this end, each of the training data points x1, x2, x3 has its core distance CD(x1), CD(x2), CD(x3) shown around it and the reachability distance between x1 and z or x2 and z or x3 and z is ascertained in accordance with the definition (2). From this set of training points x1, x2, x3, the point that provides the new sensor data point z with the shortest reachability distance minRD is then determined. This is recorded as the minimum reachability distance minRD for the new sensor data point z. The training data point x1 for which the minimum reachability distance has been defined is marked as the predecessor or as the minimum position.

The new sensor data point z is then inserted at the appropriate location in the reachability graph. FIG. 5 shows an enlarged detail 322 from the reachability graph 312 created for the training data points of the technical system is shown.

The new sensor data point z is shown to the right of the reachability graph 322 as a bar having a height corresponding to its ascertained minimum reachability distance minRD.

If the new sensor data point z cannot be reached from any other training data point, then it is inserted at the end of the reachability graph 312. Otherwise, the minimum position, that is to say the position of its predecessor, is determined. This predecessor, in graph 322 the training data point x1, and all the training data points that were processed before it, that is to say all of the training data points shown in the sequence to the left of xi, are rejected. By definition, the new sensor data point must be inserted later. For all the remaining training data points in the reachability graph 322 or 312, respectively, a check is performed to determine whether the reachability distance RD thereof is greater than the minimum reachability distance minRD of the new sensor data point z. As soon as this is the case for a training data point, the new sensor data point is inserted before this training data point. Should this never be the case by the end of the reachability graph 312, the new sensor data point is inserted at the end.

The new sensor data point z can now be assigned to a specific cluster according to the position of the data point in the enhanced reachability graph, which now contains the new sensor data point in addition to the training data points. The new sensor data point is thus always assigned to that cluster to which the predecessor, that is to say the training data point with the minimum position, also belongs. The new sensor data point z is assigned a status as normal or abnormal according to the minimum reachability distance minRD. If the minimum reachability distance minRD of the new sensor data point z is shorter than the limit reachability distance 314 shown in the reachability graph 312, the new sensor data point z is assigned the status normal; if its minimum reachability distance is greater than the limit reachability distance 314, then it is assigned a status abnormal.

It is thus possible for the new sensor data point z to be assigned a cluster and the status in a few steps. For more accurate classification of the new sensor data point z in respect of a cluster or as normal or abnormal, the density-based clustering method can be applied accordingly to the new reachability graph for cluster extraction with the sequence of the data points and the reachability distances thereof.

Figure 6:
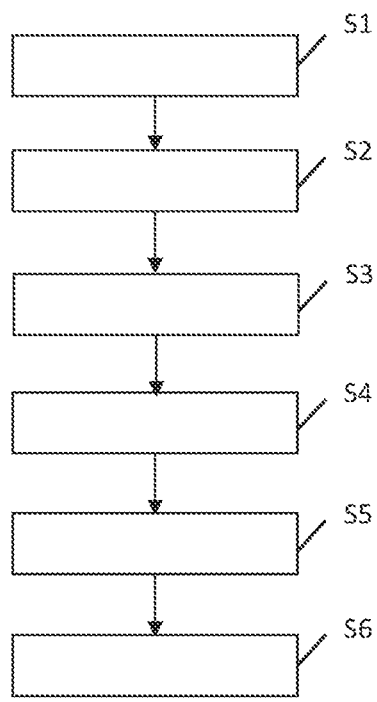
FIG. 6 shows an exemplary embodiment of the method in the form of a flowchart.

The method according to embodiments of the invention is described in summary using a flowchart with reference to FIG. 6. A first method step S1 comprises receiving a new sensor data point relating to the technical system. A minimum reachability distance with respect to a selection of neighboring training data points is then ascertained for the new sensor data point, see method step S2. The selection of training data points is consistent with the training data points x1, x2, x3 in graph 401. Method step S3 then comprises ascertaining a minimum position for the new sensor data point in the sequence of the training data points in the reachability graph 312. As shown using graphs 402 and 403, a reachability distance from the new sensor data point is ascertained for each training data point x1, x2, x3 in the selection of training data points, and the shortest of the ascertained reachability distances, see minRD in graph 403, is assigned to the new sensor data point z as the minimum reachability distance. The position of that training data point in the selection of the training data points that has the shortest ascertained reachability distance, that is to say the training data point x1 in graph 403, is ascertained as the predecessor position, and thus as the minimum position.

Method step S4 now comprises inserting the new sensor data point in the reachability graph 312 after the minimum position, that is to say here after the training point x1 and before the training data point that has a greater reachability distance than the ascertained minimum reachability distance. In the reachability graph 312' enhanced with the new sensor data point, the training data point x5 is the training data point that has a greater reachability distance than the ascertained minimum reachability distance minRD. The new sensor data point z is therefore inserted at the position shown by the arrow.

Method step S5 then comprises assigning a specific cluster to the new sensor data point, according to the position of the data point in the enhanced reachability graph 312', and a status as normal or abnormal according to the minimum reachability distance minRD compared to the limit reachability distance 314. Method step S6 comprises outputting the assigned status and/or the assigned cluster as the result of the anomaly detection. As already described for the monitoring apparatus 200, the status can also be assigned as normal or abnormal only if for a predefined number of new sensor data points or a number of new sensor data points in a time window of predefined length an anomaly detection is performed using the method described and the result of the anomaly detection is consistent with a specific rule.

The method described and the monitoring apparatus also allow sensor data received dynamically, that is to say in a time sequence, to be classified as normal or abnormal in respect of an operating mode, which is represented by the clusters, and in terms of status within a short time. Not all data points need to be available to the density-based clustering method from the outset in this case, but rather others may be added gradually.

The method described is more robust than the conventional density-based clustering method OPTICS in regard to reachability distance. The method described also solves the problem of the conventional OPTICS method, wherein a new sensor data point results in an excessively high reachability distance being assigned. This can occur if a cluster has been processed completely and there needs to be a jump to a new cluster and the jump takes place via the new sensor data point to be analyzed. This may also be the case if the parameters of the density-based clustering method are not optimally adjusted and the new sensor data point to be analyzed virtually forms a bridge between two clusters and is the nearest reachable point, whereas this is no great problem for normal clustering using OPTICS.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A monitoring apparatus for anomaly detection in a technical system, in which parameters which are relevant to the state of the system are measured by sensors continuously over time, comprising:
    an input interface, configured in such a way as to receive a new sensor data point relating to the technical system,
    an analysis unit, configured in such a way as
        to ascertain for the new sensor data point a minimum reachability distance with respect to a selection of neighboring training data points, and
        to ascertain for the new sensor data point a minimum position in the sequence of the training data points in a reachability graph, which was created by a density-based clustering function using predetermined training data points as input values and in which the sequence of the training data points is in ascending order based on an order of processing of the training data points and in which the reachability distance is indicated for each training data point,
        to insert the new sensor data point in the reachability graph after the minimum position and before the training data point that has a greater reachability distance than the ascertained minimum reachability distance,
        to assign the new sensor data point to a specific cluster according to the position of the data point in the enhanced reachability graph and to assign a status as normal or abnormal according to the minimum reachability distance, each cluster being assigned to a different operating state of the technical system, and
    an output interface configure in such a way as to output the assignment ascertained for the new sensor data point in regard to an operating mode, and the indication of a status as normal or abnormal, as the result of the anomaly detection,
    and to trigger an alarm function on the basis of the result of the anomaly detection.

2. The monitoring apparatus as claimed in claim 1, wherein the density-based clustering function is an "ordering-points-to-identify-the-clustering-structure" method, OPTICS method for short.

3. The monitoring apparatus as claimed in claim 1, configured in such a way as to apply the density-based clustering function to the reachability graph enhanced with the new sensor data point and to assign to the new sensor data point the cluster ascertained for it therefrom and the status.

4. The monitoring apparatus as claimed in claim 1, wherein the selection of the neighboring training data points contains all training data points that are at a predefined interval from the new sensor data point.

5. The monitoring apparatus as claimed in claim 4, configured in such a way as to assign a core distance having the value infinity to the new sensor data point if the number of neighboring training data points is less than a predefined number.

6. The monitoring apparatus as claimed in claim 4, configured in such a way as to ascertain for each training data point in the selection of the training data points a reachability distance from the new sensor data point and to assign the shortest of the ascertained reachability distances to the new sensor data point as the minimum reachability distance.

7. The monitoring apparatus as claimed in claim 6, configured in such a way as to ascertain in the reachability graph the position of that training data point from the selection of the training data points that has the shortest ascertained reachability distance as the predecessor position and to ascertain the next position as the minimum position for the new sensor data point.

8. The monitoring apparatus as claimed in claim 6, configured in such a way as to insert the new sensor data point at the end of the reachability graph if the reachability distance of each training data point arranged after the predecessor position in the sequence is less than the minimum reachability distance of the new sensor data point.

9. The monitoring apparatus as claimed in claim 1, configured in such a way as to perform the steps performed in the analysis unit for all new sensor data points received in a time window of predefined length or for a predefined minimum number of temporally successive new sensor data points, and to output as abnormal only if the ascertained assignments are consistent with a predefined rule.

10. The monitoring apparatus as claimed in claim 9, wherein one rule is a minimum number of new sensor data points detected as abnormal.

11. The monitoring apparatus as claimed in claim 9, wherein one rule is a rising number of new sensor data points detected as abnormal in successive time windows.

12. The monitoring apparatus as claimed in claim 9, which additionally has a user interface and is configured in such a way as to receive the length of the time window, the minimum number of new sensor data points or the type of rule.

13. The monitoring apparatus as claimed in claim 1, wherein a technical system is one or more machines or devices of an automation plant, a power distribution plant or a power generation or energy extraction plant.

14. A method for anomaly detection relating to a technical system, in which parameters which are relevant to the state of the system are measured by sensors continuously over time, carried out by a monitoring apparatus, comprising:
- receiving a new sensor data point relating to the technical system,
- ascertaining for the new sensor data point a minimum reachability distance with respect to a selection of neighboring training data points, and
- ascertaining for the new sensor data point a minimum position in the sequence of the training data points in a reachability graph, which was created by a density-based clustering function using predetermined training data points as input values and in which the sequence of the training data points is in ascending order based on an order of processing of the training data points and in which the reachability distance is indicated for each training data point,
- inserting the new sensor data point in the reachability graph after the minimum position and before the training data point that has a greater reachability distance than the ascertained minimum reachability distance,
- assigning a specific cluster to the new sensor data point according to the position of the data point in the enhanced reachability graph and assigning a status as normal or abnormal according to the minimum reachability distance, each cluster being assigned to a different operating state of the technical system, and
- outputting the assigned status and/or the assigned cluster as the result of the anomaly detection, and
- triggering an alarm function on the basis of the result of the anomaly detection.

15. A computer program product, comprising a computer readable hardware storage device having computer readable program code stored therein, said program code executable by a processor of a computer system to implement a method comprising a nonvolatile computer-readable medium that can be loaded directly into a memory of a digital computer, comprising program code parts suitable for performing the steps of the method as claimed in claim 14.

* * * * *